June 9, 1931.  A. V. CLARK  1,808,885
SURFACE ROD LINE PICK-UP
Filed May 16, 1929   2 Sheets-Sheet 2
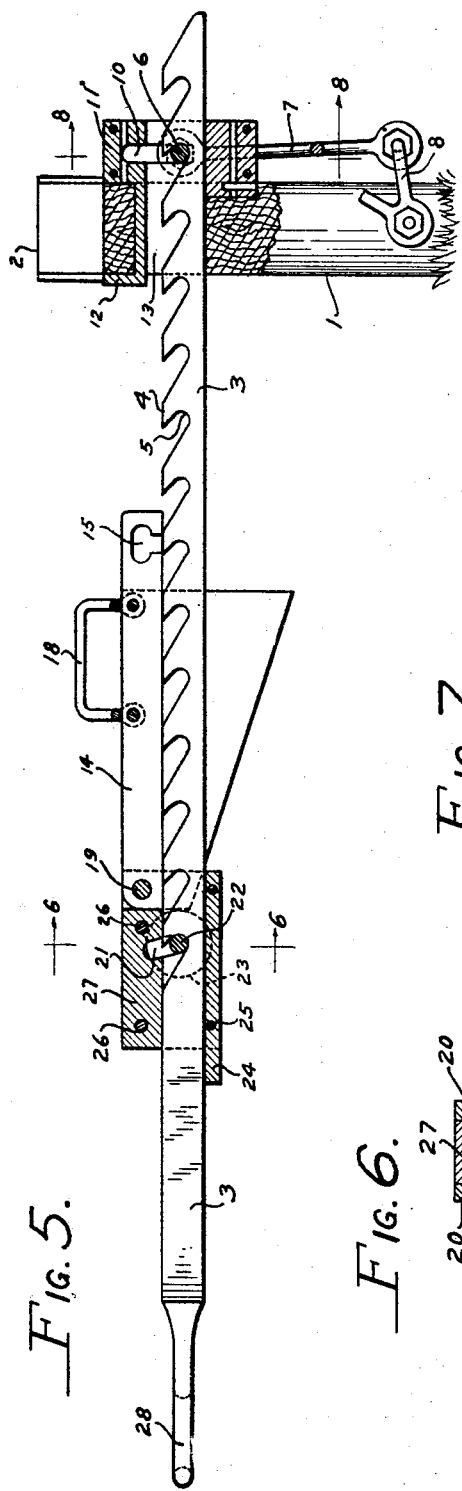
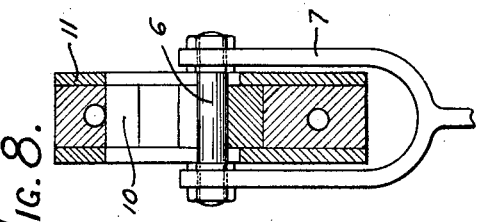
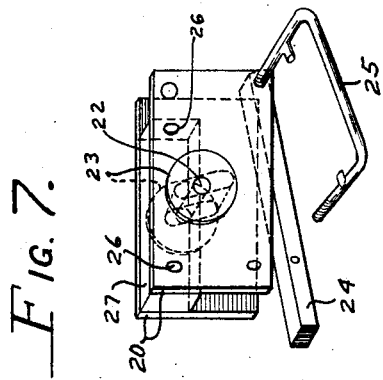
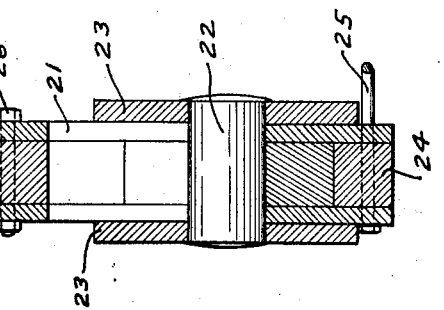
INVENTOR
Alfonso V. Clark.
BY Toulmin & Toulmin
ATTORNEY Patented June 9, 1931

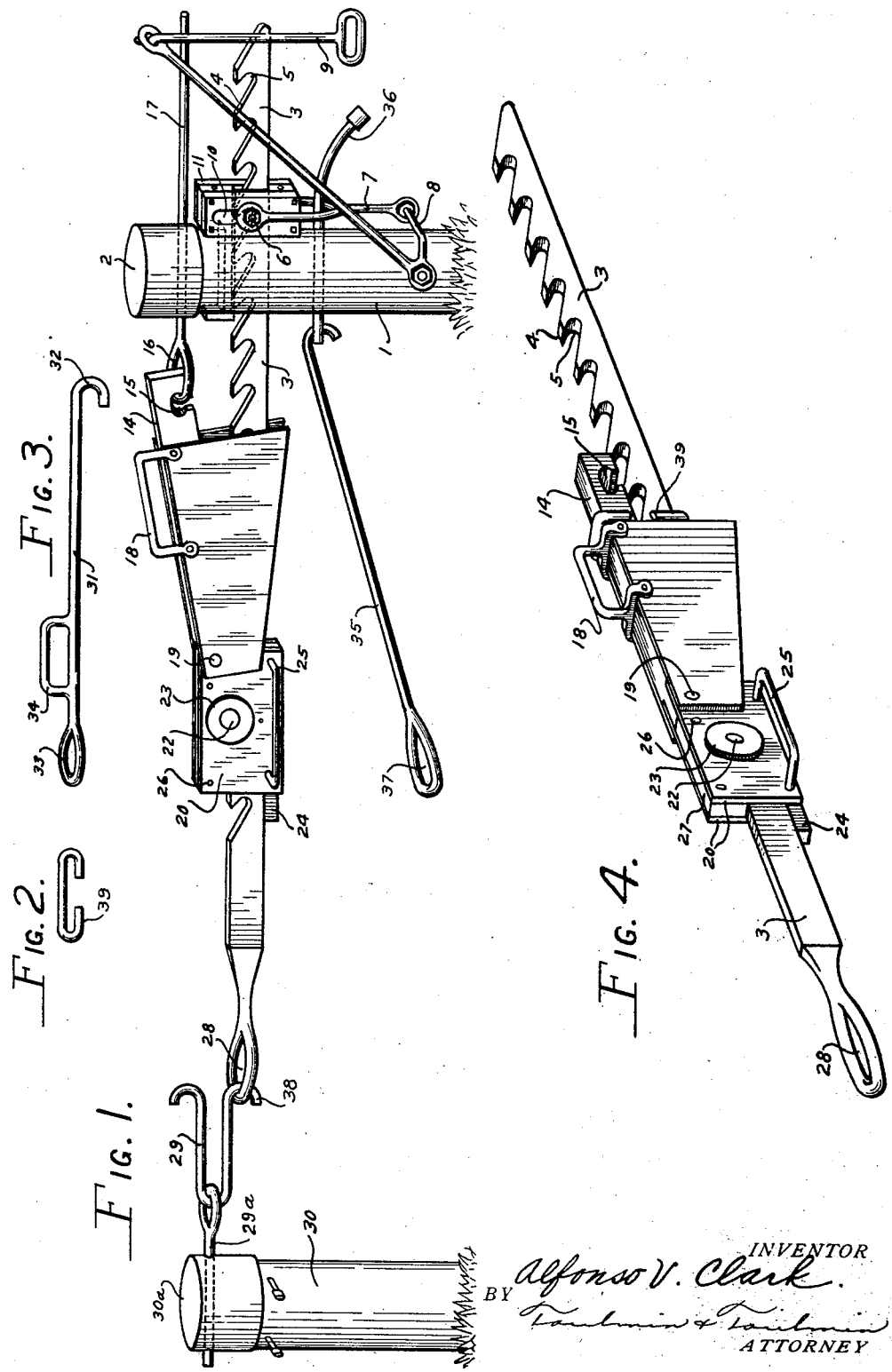

1,808,885

UNITED STATES PATENT OFFICE

ALFONSO V. CLARK, OF CASEY, ILLINOIS

SURFACE ROD LINE PICK-UP

Application filed May 16, 1929. Serial No. 363,698.

My invention relates to safety surface rod line pick-up devices for picking up surface rod lines of well or cable lines in connecting them to sources of power.

It is an object of my invention to provide a safe device which may be connected or disconnected from the power plunger rod without danger of injury from the device or its connection.

It is a further object to provide a device which is portable, that operates substantially automatically and which eliminates hooks, jack and chain and other devices which are dangerous to the operator.

It is an object to provide such a device for use at power end junctions in the field for pulling up surface rod lines after the lines have been repaired and are ready to be connected to any pumping power that is in motion. My device is also adaptable for facilitating repairs of the pump jacks, rod lines and the like.

Referring to the drawings:—

Fig. 1 is a perspective showing my apparatus in operation;

Fig. 2 is a transporting clamping hook;

Fig. 3 is a connecting hook;

Fig. 4 is a perspective of my safety device;

Fig. 5 is a section through my safety device;

Fig. 6 is a section on the line 6—6 of Fig. 5;

Fig. 7 is a perspective partially disassembled, showing one of the locking devices;

Fig. 8 is a section on the line 8—8 of Fig. 5.

Referring to the drawings in detail, 1 is a post having a cap 2 through which passes the ratchet bar 3, having teeth 4 and slots 5. Mounted on this bar is a transverse rod 6 operated by the yoke 7, the bell crank 8 pivoted at the post 1, and the lever 9. The function of this rod 6 is to drop into the slots 5 as the source of power and the rod or cable are being drawn together for the purpose of connection by my safety device. This rod 6 works in a slot 10 carried in a box 11 which is mounted by hooks 12 within the post slots 13 of the post 1. It is this slot 13 through which the ratchet bar operates.

Mounted upon the ratchet bar is a slidable saddle comprising a pivoted connecting portion 14 having a slidable hook 15 for connection to the eye 16 of the power plunger rod 17. This movable saddle 14 is provided with a handle 18.

It is pivoted at 19 to the ratchet block 20 which slides upon the bar 3. This block has diagonally disposed apertures 21 in which is arranged transversely a pin 22 that is adapted to drop down into slots 5 of ratchet 3. This pin is provided with side disks 23 bearing against the sides of the block 20 to guide the movement of the pin and to force it into the slots 5.

In order to retain this block on the ratchet rod I provide a bearing strip 24 which is held in position by the U-bolt 25 passing through the side walls of the block 20 and through the strip 24.

The upper ends of the side walls of block 20 are held together by the bolts 26 which pass through the filler 27.

The left hand end of the rack bar 3 is provided with an eye 28 which is connected to the disconnecting hook 29 that is carried on the post 30.

As the power plunger rod 17 reciprocates after the ratchet rod 3 has been drawn up taut and the pin 6 dropped into the appropriate slot, eye 16 is placed in the hook 15 and as the rod reciprocates the pin 22 drops into successive slots in the rod 3 until the connection has been made as close as possible, whereupon the link 31 has its hook 32 inserted into eye 16 and its eye 33 connected to a suitable cable or surface rod whereupon the connection is made which is desired. The handle 34 on the hook 31 facilitates the operation.

In operation, as a result of the use of this convenience, I am enabled to connect the rod 17 through the eye 16 to the hook 32 of the link 31; I also hook the eye 33 of the link 31 onto the hook 29 which is connected to the rod 29a to put the surface rod line in motion.

The link 35 which is connected by the attaching link 36 to the post 1 is used through its eye 37 to connect to the lower hook 38 which in turn connects it to the rod 29a. This anchors the surface rod line in off position. The iron post 30 has a wooden cap 30a through the rod 29a which slides.

The clamping hook 39 is mounted as shown in Fig. 4 to hold the devices of my invention in inoperative position while it is being transported from one job to another.

It will be understood that I desire to comprehend within my invention and within the scope of my claims such modifications as may be fairly comprehended within such claims and inventions due to necessary modifications to adapt my invention to varying conditions of use and to varying purposes.

Having thus fully described my invention, what I claim is new and desire to secure by Letters Patent, is:

1. In combination, a post, a ratchet rod slidably mounted therethrough, means for retaining ratchet rod in predetermined relationship with said post, a second post, a disconnecting hook associated therewith connected to said ratchet rod, a reciprocating member adapted to engage teeth successively to said ratchet rod and means on said reciprocating member for connection to a power plunger rod.

2. In combination, a rack bar, a slotted post for receiving said rack bar, a box carried by said post, a reciprocating transverse rod guided by said box adapted to engage the rack bar teeth, means for raising and lowering said rod on said rack bar, a disconnecting hook connected thereto, a second lock box slidably mounted on said rack bar having a transverse locking bolt for engaging the teeth thereof, a pivoted saddle connected thereto having a slot on one end and a power plunger rod having an eye engaging said slot.

3. In combination, a rack bar, a slotted post for receiving said rack bar, a box carried by said post, a reciprocating transverse rod guided by said box adapted to engage the rack bar teeth, means for raising and lowering said rod on said rack bar, a disconnecting hook connected thereto, a second lock box slidably mounted on said rack bar, having a transverse locking bolt for engaging the teeth thereof, a pivoted saddle connected thereto having a slot on one end and a power plunger rod having an eye engaging said slot, said box slidably mounted on said rack bar having means detachable from said box for retaining it on said rack bar.

4. In combination, a rack bar having teeth on one side, an eye at one end, a box having transverse side openings slidably mounted thereon, a transverse rod mounted in said box adapted to engage teeth of said rack bar, a pivoted saddle mounted on said box covering the top of a portion of said teeth and guarding the slide thereof, a hook on said saddle and a handle on said saddle.

5. In combination, a post having a transverse slot, a box mounted thereon having a hook projected through said slot and engaging said post, a transverse locking rod adapted to reciprocate in said box, said box having a slot coinciding with the slot in the post, a yoke carrying said rod, a bell crank pivoted on said post operating said yoke and a lever handle for operating said bell crank.

6. In combination, a locking box having side walls with diagonally disposed slots, a pin traveling in said slots connecting said side walls, guards on the end of said pins engaged on the outside of said side walls and a detachable lower filler member spaced from said pins carried between said side walls.

7. In combination, a locking box having side walls with diagonally disposed slots, a pin traveling in said slots connecting said side walls guards on the end of said pins engaged on the outside of said side walls, a detachable lower filler member spaced from said pins carried between said side walls, spaced ears on said box formed by said side walls and a U-shaped saddle pivoted thereon having a power plunger rod and slotted hook thereon.

In testimony whereof I affix my signature.

ALFONSO V. CLARK.